US012072673B2

(12) United States Patent
Winkler et al.

(10) Patent No.: US 12,072,673 B2
(45) Date of Patent: Aug. 27, 2024

(54) SHOCKPROOF PROTECTION WITH BANKING OF A ROTARY FLEXIBLE GUIDANCE RESONATOR MECHANISM

(71) Applicant: ETA SA Manufacture Horlogère Suisse, Grenchen (CH)

(72) Inventors: Pascal Winkler, St-Blaise (CH); Raphaël Courvoisier, Corcelles (CH); Jean-Luc Helfer, Le Landeron (CH); Jérôme Favre, Neuchâtel (CH); Dominique Lechot, Les Reussilles (CH)

(73) Assignee: ETA SA Manufacture Horlogère Suisse, Grenchen (CH)

( * ) Notice: Subject to any disclaimer, the term of this patent is extended or adjusted under 35 U.S.C. 154(b) by 445 days.

(21) Appl. No.: 17/474,430

(22) Filed: Sep. 14, 2021

(65) Prior Publication Data

US 2022/0091562 A1 Mar. 24, 2022

(30) Foreign Application Priority Data

Sep. 18, 2020 (EP) .................................... 20196863

(51) Int. Cl.
*G04B 17/04* (2006.01)
*G04B 17/28* (2006.01)
(Continued)

(52) U.S. Cl.
CPC ........... *G04B 17/045* (2013.01); *G04B 17/28* (2013.01); *G04B 17/32* (2013.01); *G04B 31/02* (2013.01); *G04B 43/002* (2013.01)

(58) Field of Classification Search
None
See application file for complete search history.

(56) References Cited

U.S. PATENT DOCUMENTS

2006/0187767 A1* 8/2006 Conus .................... G04B 31/04 368/324
2019/0011887 A1 1/2019 Mallet et al.
2019/0324401 A1 10/2019 Winkler et al.

FOREIGN PATENT DOCUMENTS

CH 711 571 A2 3/2017
CH 711594 A2 * 3/2017 ............ G04B 15/08
(Continued)

OTHER PUBLICATIONS

Translation of CH711594, Espacenet, 2023.*
(Continued)

*Primary Examiner* — Renee S Luebke
*Assistant Examiner* — Matthew Hwang
(74) *Attorney, Agent, or Firm* — Oblon, McClelland, Maier & Neustadt, L.L.P.

(57) ABSTRACT

A horological resonator mechanism, including a structure and an anchoring unit from which is suspended at least one inertial element arranged to oscillate along a first degree of freedom in rotation RZ about a pivoting axis extending along a first direction Z, the inertial element being subjected to return forces exerted by a virtual pivot including a plurality of substantially longitudinal elastic strips, each fastened, at a first end to the anchoring unit, and at a second end to the inertial element. Each elastic strip is deformable essentially in a plane XY perpendicular to the first direction Z. The anchoring unit is suspended from the structure by a flexible suspension arranged to allow the mobility of the anchoring unit along a plurality of degrees of freedom including at least two in the plane XY, along a direction X and along a direction Y orthogonal to the direction X.

22 Claims, 2 Drawing Sheets

(51) Int. Cl.
*G04B 17/32* (2006.01)
*G04B 31/02* (2006.01)
*G04B 43/00* (2006.01)

(56) References Cited

FOREIGN PATENT DOCUMENTS

| | | | | |
|---|---|---|---|---|
| CH | 714032 | A2 * | 1/2019 | ........... B81B 3/0045 |
| CH | 714 361 | A2 | 5/2019 | |
| CN | 106444336 | A | 2/2017 | |
| CN | 108073066 | A | 5/2018 | |
| CN | 109212943 | A | 1/2019 | |
| CN | 109426128 | A | 3/2019 | |
| CN | 110389519 | A | 10/2019 | |
| CN | 110398893 | A | 11/2019 | |
| CN | 110546581 | A | 12/2019 | |
| CN | 111324027 | A | 6/2020 | |
| EP | 3 425 458 | A1 | 1/2019 | |
| EP | 3 561 609 | A1 | 10/2019 | |
| JP | 2003-255057 | A | 9/2003 | |
| WO | WO 2020/152578 | A1 | 7/2020 | |

OTHER PUBLICATIONS

Translation of CH714032, Espacenet, 2023.*
Polyoxymethylene, Wikipedia, 2018.*
Screw, Wikipedia, 2018.*
European Search Report issued Feb. 17, 2021 in European Application 20196863.3, filed on Sep. 18, 2020 (with English Translation of Categories of cited documents), 3 pages.
Combined Chinese Office Action and Search Report issued Nov. 28, 2022, in corresponding Chinese Patent Application No. 202111093361.1 (with English Translation of Category of Cited Documents), 11 pages.

* cited by examiner

SHOCKPROOF PROTECTION WITH BANKING OF A ROTARY FLEXIBLE GUIDANCE RESONATOR MECHANISM

CROSS-REFERENCE TO RELATED APPLICATION

This application claims priority to European Patent Application No. 20196863.3 filed on Sep. 18, 2020, the entire disclosure of which is hereby incorporated herein by reference.

FIELD OF THE INVENTION

The invention relates to a horological resonator mechanism, including a structure and an anchoring unit from which is suspended at least one inertial element, a virtual pivot including a plurality of substantially longitudinal elastic strips, each fastened, at a first end to said anchoring unit, and at a second end to said inertial element.

The invention further relates to a horological movement including at least one such resonator mechanism.

The invention relates to the field of horological resonators, and especially those which include elastic strips acting as return means for the running of the oscillator.

BACKGROUND OF THE INVENTION

Suspension torsional rigidity is a difficult aspect for most horological oscillators including at least one spiral spring or elastic strips forming a flexible guidance, and particularly for crossed strip resonators. And shock resistance is also dependent on this torsional rigidity; indeed, during shocks, the stress sustained by the strips quickly reaches very substantial values, which accordingly reduces the travel that the part can cover before yielding. Shock-absorbers for timepieces are available in numerous variants. However, they are essentially intended to protect the fragile pivots of the resonator shafts, and not the elastic elements, such as conventionally the spiral spring.

Novel mechanism architectures help maximise the quality factor of a resonator, through the use of a flexible guidance with the use of a pallet escapement with a very small lifting angle, according to application CH15442016 on behalf of ETA Manufacture Horlogère Suisse and the derivatives thereof, the lessons whereof are directly usable in the present invention, and wherein the resonator can be improved further in respect of the susceptibility thereof to shocks, along certain particular directions. Therefore, it is necessary to protect the strips from breaking in the event of shocks. It is observed that the shockproof systems currently available for flexible guidance resonators, protect strips from shocks only in certain directions, but not in all directions, or they have the defect of allowing the setting of the virtual pivot to move slightly along the oscillation rotation thereof, which is to be avoided as much as possible.

Application CH5182018 or application EP18168765 on behalf of ETA Manufacture Horlogère Suisse describes a horological resonator mechanism, including a structure bearing, via a flexible suspension, an anchoring unit from which is suspended an inertial element oscillating according to a first degree of freedom in rotation RZ, under the action of return forces exerted by a virtual pivot including first elastic strips each fastened to said inertial element and to said anchoring unit, the flexible suspension being arranged to allow a certain mobility of the anchoring unit along all the degrees of freedom other than the first degree of freedom in rotation RZ whereby only the inertial element is mobile to avoid any disturbance of the oscillation thereof, and the rigidity of the suspension along the first degree of freedom in rotation RZ is very substantially greater than the rigidity of the virtual pivot along this same first degree of freedom in rotation RZ.

Application CH715526 or application EP3561607 on behalf of ETA Manufacture Horlogère Suisse describes a horological resonator mechanism, including a structure and an anchoring unit from which is suspended at least one inertial element arranged to oscillate along a first degree of freedom in rotation RZ about a pivoting axis extending along a first direction Z, said inertial element being subjected to return forces exerted by a virtual pivot including a plurality of substantially longitudinal elastic strips, each fastened, at a first end to said anchoring unit, and at a first end to said inertial element, each said elastic strip being deformable essentially in a plane XY perpendicular to said first direction Z.

However, it happens that one or more strips of the flexible suspension break following a substantial shock, or that they are prematurely worn until a likely breaking following a series of minor shocks. Indeed, the flexible suspension prevents the breaking of the virtual pivot, but it sustains the shock instead. In particular, when the mechanism sustains a shock in the direction Z, which is perpendicular to the flexible suspension, it is subjected to a rotation about an axis of the plane of the suspension, which can cause one or more strips to break.

SUMMARY OF THE INVENTION

The invention proposes to improve the resonator mechanism of application CH715526 or application EP3561607 on behalf of ETA Manufacture Horlogère Suisse to protect the flexible suspension from the drawbacks cited above.

To this end, the invention relates to a horological resonator mechanism, including a structure and an anchoring unit from which is suspended at least one inertial element arranged to oscillate along a first degree of freedom in rotation RZ about a pivoting axis extending along a first direction Z, said inertial element being subjected to return forces exerted by a virtual pivot including a plurality of substantially longitudinal elastic strips, each fastened, at a first end to said anchoring unit, and at a second end to said inertial element, each said elastic strip being deformable essentially in a plane XY perpendicular to said first direction Z, said anchoring unit being suspended from said structure by a flexible suspension arranged to allow the mobility of said anchoring unit along a plurality of degrees of freedom including at least two in the plane XY, along a direction X and along a direction Y orthogonal to said direction X, said flexible suspension including, between said anchoring unit and a first intermediate mass, which is fastened to said structure directly or by means of a flexible plate along said first direction Z, a transverse translation table with flexible guidance and including transverse strips or rectilinear, transverse flexible rods, extending along said second direction X.

The invention is remarkable in that the mechanism comprises banking means arranged to limit the travel in rotation and/or in translation of the flexible suspension in at least one direction.

Thus, by the banking means, the flexible suspension is stopped in the case of a significant shock, particularly in the direction Z, to prevent one of the strips or rods thereof from breaking. There is a dual protection, a first protection for the strips of the virtual pivot thanks to the flexible suspension, and a second protection for the flexible suspension thanks to the banking means. Consequently, the invention improves the protection of the resonator mechanism against the risk of breakage.

According to a particular embodiment of the invention, said banking means are arranged to limit the travel in rotation and in translation of the flexible suspension in the direction Z.

According to a particular embodiment of the invention, said banking means are arranged to limit the travel in rotation and in translation of the flexible suspension in a direction of the plane XY.

According to a particular embodiment of the invention, said banking means comprise a stud extending perpendicularly to the plane of the flexible suspension.

According to a particular embodiment of the invention, the travel is limited to a predefined value, for example 100 μm with respect to the rest position of said flexible suspension.

According to a particular embodiment of the invention, said banking means are arranged at a distance corresponding to the predefined value.

According to a particular embodiment of the invention, said banking means are arranged through an opening of the first intermediate mass, the opening having dimensions corresponding to the predefined value.

According to a particular embodiment of the invention, said banking means include a shock-absorbing material, such as polyoxymethylene type polymers.

According to a particular embodiment of the invention, said banking means include a rigid material, such as metal.

According to a particular embodiment of the invention, said banking means include at least two stages to control the shake of the intermediate parts.

According to a particular embodiment of the invention, said flexible suspension includes a second intermediate mass and a longitudinal translation table with flexible guidance, the longitudinal translation table being arranged between said anchoring unit and the second intermediate mass, the longitudinal translation table including longitudinal strips or rectilinear, longitudinal flexible rods, extending along said third direction Y, and includes said transverse translation table between said second intermediate mass and said first intermediate mass.

According to a particular embodiment of the invention, said banking means are disposed in the vicinity of the second intermediate mass, such that said banking means are arranged to cooperate in banking support with said second intermediate mass for the protection of said transverse or longitudinal strips or rods at least against the shocks in the direction Z.

According to a particular embodiment of the invention, the mobility of said anchoring unit is possible along five degrees of freedom of the flexible suspension which are a first degree of freedom in translation along said first direction Z, a second degree of freedom in translation along the second direction X orthogonal to said first direction Z, a third degree of freedom in translation along the third direction Y orthogonal to said second direction X and to said first direction Z, a second degree of freedom in rotation RX about an axis extending along said second direction X, and a third degree of freedom in rotation RY about an axis extending along said third direction Y.

According to a particular embodiment of the invention, said flexible suspension includes a second intermediate mass and a longitudinal translation table with flexible guidance, the longitudinal translation table being arranged between said anchoring unit and the second intermediate mass, the longitudinal translation table including longitudinal strips or rectilinear, longitudinal flexible rods, extending along said third direction Y, and includes said transverse translation table between said second intermediate mass and said first intermediate mass.

According to a particular embodiment of the invention, said longitudinal translation table includes at least two said longitudinal flexible strips or rods, parallel with one another and of the same length.

According to a particular embodiment of the invention, said longitudinal translation table and said transverse translation table each include at least two said flexible strips or rods, each said strip or rod being characterised by the thickness thereof along said second direction X when said strip or rod extends along said third direction Y or vice versa, by the height thereof along said first direction Z, and by the length thereof along the direction along which said strip or rod extends, said length being at least five times greater than said height, said height being at least as great as said thickness.

According to a particular embodiment of the invention, said transverse translation table includes at least two said transverse flexible strips or rods, parallel with one another and of the same length.

According to a particular embodiment of the invention, said transverse strips or rods of said transverse translation table have a first plane of symmetry parallel with said transverse axis and passing through said pivoting axis, and/or a second plane of symmetry parallel with said transverse axis and orthogonal to said pivoting axis, and/or a third plane of symmetry perpendicular to said transverse axis and parallel with said pivoting axis.

According to a particular embodiment of the invention, said resonator mechanism includes axial banking means including at least a first axial banking and a second axial banking to limit the travel in translation of said inertial element at least along said first direction Z, said axial banking means being arranged to cooperate in banking support with said inertial element for the protection of said longitudinal strips at least against the axial shocks along said first direction Z, and in that said second plane of symmetry is substantially at equal distance from said first axial banking and said second axial banking.

According to a particular embodiment of the invention, said longitudinal axis intersects with said transverse axis.

According to a particular embodiment of the invention, the resonator mechanism comprises a viscous substance arranged on the strips or rods of the translation tables, to dissipate the energy in the event of a shock.

The invention further relates to a horological movement including at least one resonator mechanism according to the invention, and/or at least one horological oscillator mechanism including a horological resonator mechanism and an escapement mechanism, which are arranged to cooperate with one another.

BRIEF DESCRIPTION OF THE DRAWINGS

Further features and advantages of the present invention will emerge on reading the following detailed description, with reference to the appended figures, wherein.

DETAILED DESCRIPTION OF PREFERRED EMBODIMENTS

Figure 1:
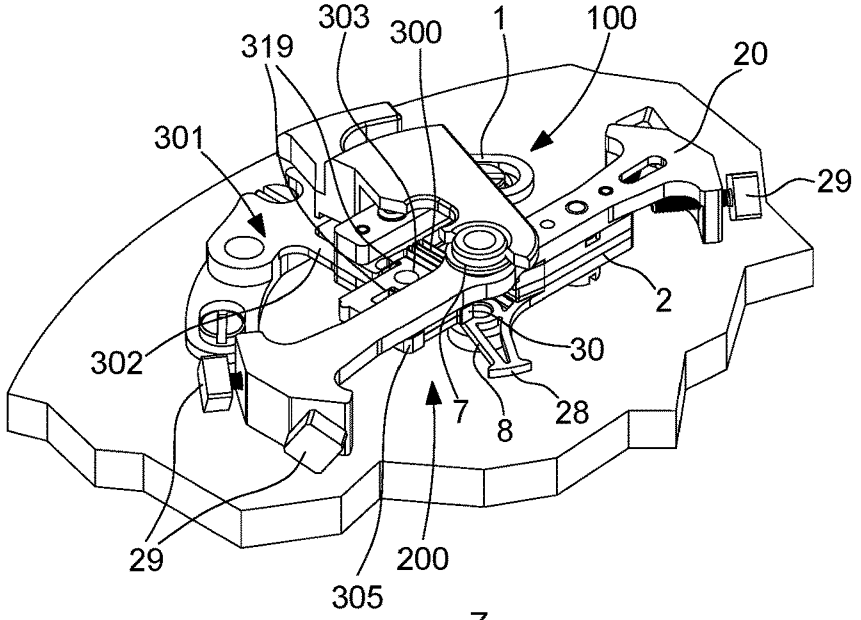
FIG. 1 represents, schematically, and in a perspective view, a resonator mechanism with elastic strips, including an inertial mass suspended from an anchoring unit by a virtual pivot, and banking means according to the invention.

The invention relates to a horological resonator mechanism, which represents a variant of the resonators described in application CH5182018 or application EP18168765 on behalf of ETA Manufacture Horlogère Suisse, incorporated here by reference, and wherein a person skilled in the art would be able to combine the features with those specific to the present invention. Represented in FIGS. 1 to 3, this horological resonator mechanism 100 includes a structure 1 and an anchoring unit 30, from which is suspended at least one inertial element 2 arranged to oscillate along a first degree of freedom in rotation RZ about a pivoting axis D extending along a first direction Z. The inertial element 2 comprises a balance 20. The balance is bone-shaped, the balance comprising a straight segment equipped with a bulb at each end. Each bulb can include small inertia-blocks 29 to set the inertia of the inertial element 2. This inertial element 2 is subjected to return forces exerted by a virtual pivot 200 including a plurality of substantially longitudinal elastic strips 3, each fastened, at a first end to the anchoring unit 30, and at a second end to the inertial element 2. Each elastic strip 3 is deformable essentially in a plane XY perpendicular to the first direction Z.

The anchoring unit 30 is suspended from the structure 1 by a flexible suspension 300, which is arranged to allow the mobility of the anchoring unit 30 along five flexible degrees of freedom of the suspension which are:

- a first degree of freedom in translation along the first direction Z,
- a second degree of freedom in translation along a second direction X orthogonal to the first direction Z,
- a third degree of freedom in translation along a third direction Y orthogonal to the second direction X and to the first direction Z,
- a second degree of freedom in rotation RX about an axis extending along the second direction X, and
- a third degree of freedom in rotation RY about an axis extending along the third direction Y.

The principle consists of using the torsional flexibility of a translation table to better manage the torsional rigidities of the suspension. For this purpose, the strips of the tables XY are oriented in such a way that the direction of greater torsional flexibility concerns the axis of rotation of the resonator. The torsional flexibility thereof is managed by moving the strips closer to one another.

Thus, the flexible suspension 300 includes, between the anchoring unit 30 and a first intermediate mass 303, which is fastened to the structure 1 directly or by means of a flexible plate 301 along the first direction Z, a transverse translation table 32 with flexible guidance, and which includes transverse strips 320 or rectilinear, transverse flexible rods, extending along the second direction X.

In a particular non-limiting embodiment, and as illustrated by the figures, the flexible suspension 300 further includes, between the anchoring unit 30 and a second intermediate mass 305, a longitudinal translation table 31 with flexible guidance, and which includes longitudinal strips 310 or rectilinear, longitudinal flexible rods, extending along the third direction Y. And, between the second intermediate mass 305 and the first intermediate mass 303, the transverse translation table 32 with flexible guidance includes transverse strips 320 or rectilinear, transverse flexible rods, extending along the second direction X.

More particularly, the longitudinal axis D1 intersects the transverse axis D2, and in particular the longitudinal axis D1, the transverse axis D2, and the pivoting axis D are concurrent.

More particularly, the longitudinal translation table 31 and the transverse translation table 32 each include at least two said flexible strips or rods, each strip or rod being characterised by the thickness thereof along said second direction X when the strip or rod extends along the third direction Y or vice versa, by the height thereof along said first direction Z, and by the length thereof along the direction along which said strip or rod extends, the length being for example at least five times greater than the height, the height being at least as great as the thickness, and more particularly at least five times greater than this thickness, and even more particularly at least seven times greater than this thickness.

More particularly, the transverse translation table 32 includes at least two transverse flexible strips or rods, parallel with one another and of the same length. FIGS. 1 to 5 illustrate a non-limiting variant with four parallel transverse strips, and, more particularly, each consisting of two half-strips arranged on two superimposed levels, and extending from one another along the first direction Z. These half-strips can be either entirely free in relation to one another, or attached by bonding or similar, or by $SiO_2$ growth in the case of a silicon execution, or similar. Naturally, the longitudinal translation table 31, when it exists as it is optional, can obey the same design principle. The number, layout, and the cross-section of these strips or rods can vary without deviating from the present invention.

According to the invention, the resonator mechanism 100 comprises banking means 10 arranged to limit the travel in rotation and/or in translation of the flexible suspension 300 in at least one direction. Preferably, the banking means limit the travel of the flexible suspension 300 in the direction Z. Thus, in the case of shock on the resonator mechanism in the direction Z, the flexible suspension 300 performs a rotation along RX our RY, but is locked by the banking means, such that the strips of the suspension are preserved. For this purpose, the banking means press above and/or below the flexible suspension to hold the suspension in the direction Z.

Furthermore, the banking means limit the travel in rotation and in translation of the flexible suspension in a direction of the plane XY. Thus, in the case of shock on the resonator mechanism in the plane XY, the flexible suspension 300 performs a rotation along RZ, but is locked by the banking means. To this end, the banking means press laterally against the flexible suspension to hold the suspension in the plane XY. The travel is limited to a predefined value, for example 100 μm with respect to the rest position of said flexible suspension 300 in the direction Z. To this end, said banking means 10 are arranged at a distance corresponding to the predefined value.

Figure 2:
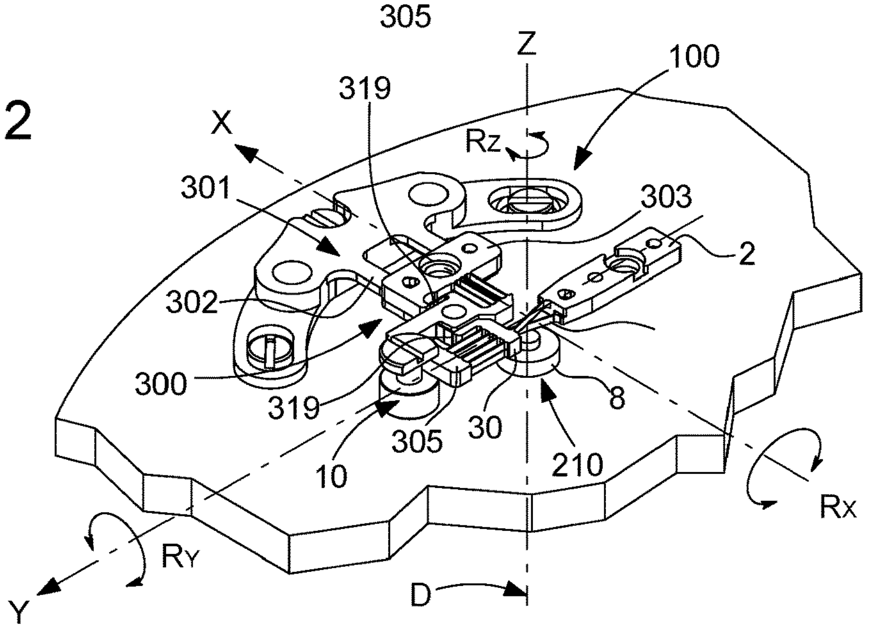
FIG. 2 represents, schematically, and in a perspective view, a first embodiment of the mechanism with the different degrees of freedom of the inertial mass included in the resonator mechanism in FIG. 1, the banking means being arranged in the vicinity of the first intermediate mass; the balance is disposed to show the flexible guidance with the two crossed elastic strips in projection, as well as the two translation tables.

In a first embodiment, represented in FIG. 2, said banking means 10 are disposed in the vicinity of the second intermediate mass 305, such that said banking means 10 are arranged to cooperate in banking support with said second intermediate mass 305. Said banking means 10 are arranged at least partially overhanging above said second intermediate mass 305 to reduce the travel thereof in the direction Z. Thus, a protection of said transverse 320, or longitudinal strips or rods 310 is obtained at least against shocks along the axis Z about the axes of rotation RX or RY. In the event of shock, the flexible suspension 300 moves in the direction Z about the axes of rotations RX or RY.

Moreover, said banking means 10 being disposed in the vicinity of the second intermediate mass 305, they reduce the travel thereof in the plane XY. Thus, an additional protection of said transverse 320, or longitudinal strips or rods 310 is obtained at least against radial shocks in the plane XY about the axis of rotation RZ. In the event of shock, the flexible suspension 300 moves in the plane XY to absorb the shocks. If the shock is too great, the travel of the flexible suspension 300 is reduced as the second intermediate mass 305 is stopped by the banking means 10.

Figure 3:
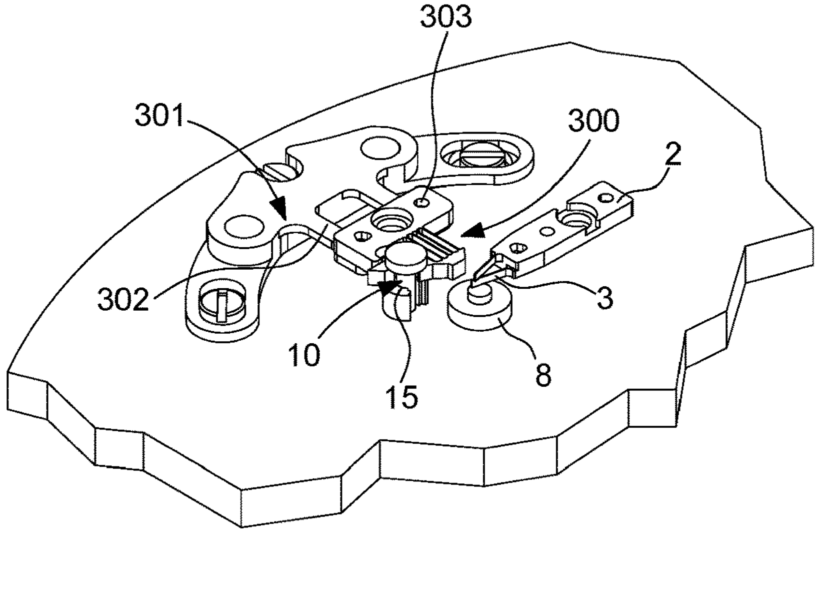
FIG. 3 represents, schematically, and in a perspective view, a second embodiment of the mechanism wherein the banking means are arranged in an opening of the first intermediate mass.
Figure 4:
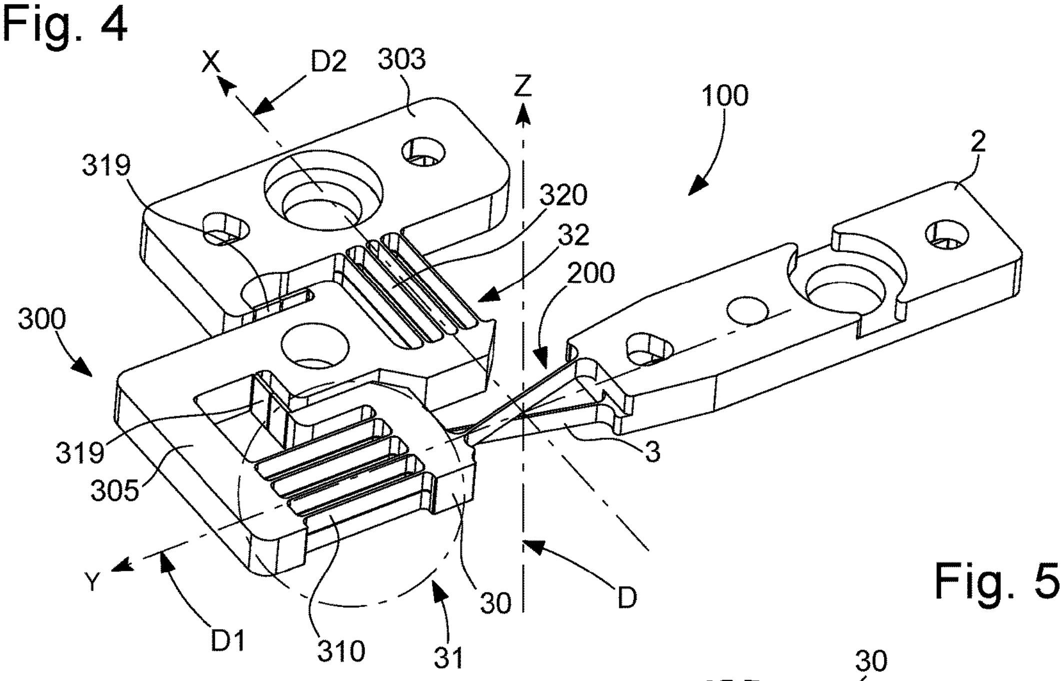
FIG. 4 represents, schematically, and in a perspective view, a flexible suspension of the resonator mechanism.
Figure 5:
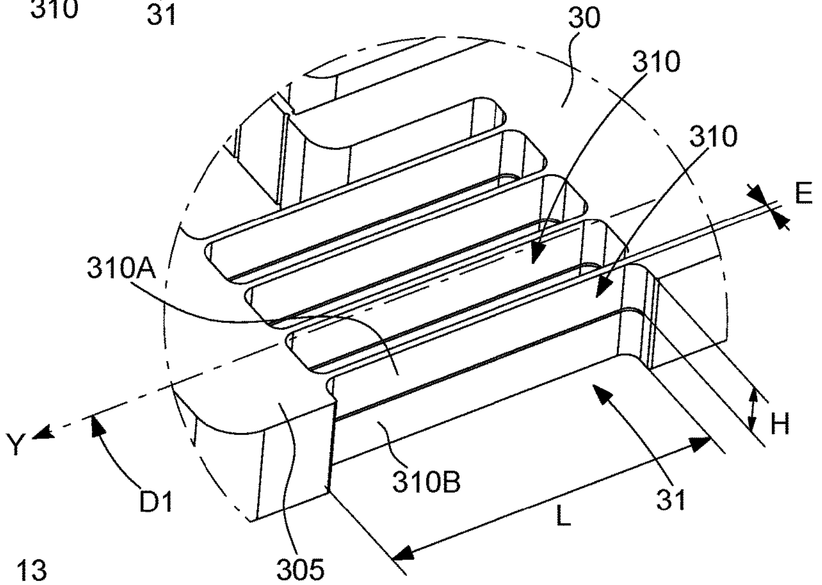
FIG. 5 is a detailed drawing of the rectilinear flexible strips with a substantially rectangular cross-section.
Figure 6:
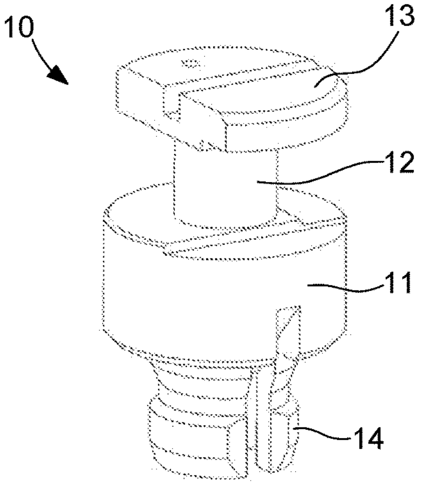
FIG. 6 represents an embodiment of the banking means.

In FIGS. 2 and 3, said banking means 10 comprise a stud extending perpendicularly to the plane of the flexible suspension. In FIG. 6, the stud comprises a first cylindrical section 11 set in a static element of the movement, such as a bridge or a plate, by clicking means 14, followed by a narrower second cylindrical section 12 above the first section 11 and a screw head 13 on the second section 12. The screw head 13 has a greater width than the second section 12. The screw head 13 is overhanging above said second intermediate mass 305 to reduce the travel thereof in the direction Z. Thus, said banking means 10 include at least two stages to control the shake of the intermediate parts in the direction Z.

Other forms of bankings are obviously possible, such as non-staged studs, cubic studs, screws, or a part of a static element of the movement. In a second embodiment, represented in FIG. 3, said banking means 10 are arranged through an opening 15 of the flexible suspension 300. The opening 15 has dimensions corresponding to the predefined value to obtain the sought clearance, the radius being for example substantially equivalent to the predefined value in the case of a circular opening. Thus, the edge of the opening 15 touches the banking means 10, in the case of a rough shock in the plane XY, whereas the banking means act in the same way as the first embodiment in the event of shock in the direction Z. The banking means are assembled with a static element of the movement under the flexible suspension 300.

According to different variants of each embodiment, the banking means can be provided only in the plane XY or in the direction Z. In other words, the embodiments described mention several directions, but they can be provided only for the direction Z or in the plane XY for example, by choosing suitable dimensions. In a variant of each embodiment, said banking means 10 include a shock-absorbing material, such as polymers, for example of polyoxymethylene type.

According to a further variant of each embodiment, said banking means 10 include a rigid material, such as metal.

Particularly, the resonator mechanism 100 includes axial banking means including at least a first axial banking 7 and a second axial banking 8 to limit the travel in translation of the inertial element 2 at least along the first direction Z, the axial banking means being arranged to cooperate in banking support with the inertial element 2 for the protection of the longitudinal strips 3 at least against the axial shocks along the first direction Z, and the second plane of symmetry is substantially at equal distance from the first axial banking 7 and the second axial banking 8.

In a particular variant, the resonator mechanism 100 includes a plate 301, including at least one flexible strip 302 extending in the plane perpendicular to the pivoting axis D, and fastened to the structure 1 and to the first intermediate mass 303, and which is arranged to allow a mobility of the first intermediate mass 303 along the first direction Z. More particularly, the plate 301 includes at least two coplanar flexible strips 302. Such a plate 301 is however optional if the height of the strips of the translation tables XY is low with respect to the height of the flexible strips 3, in particular less than one third of the height of the flexible strips 3.

In an advantageous embodiment, the resonator mechanism 100 includes a one-piece assembly, which contains at least the anchoring unit 30, a base of the at least one inertial element 2, the virtual pivot 200, the flexible suspension 300, the first intermediate mass 303, and the transverse translation table 32, and includes at least one divisible element 319 arranged to secure the components of the one-piece assembly during the assembly thereof on the structure 1, and the breaking whereof releases all of the mobile components of the one-piece assembly.

More particularly, the one-piece assembly further includes at least the second intermediate mass 305 and the longitudinal translation table 31.

As disclosed above, the technology used for manufacture makes it possible to obtain two separate strips in the height of a silicon wafer, which promotes the torsional flexibility of the table without making it more flexible for translation. And the resonator mechanism 100 can thus advantageously include at least two superimposed elementary one-piece assemblies, which each contain a level of the anchoring unit 30, and/or a base of the at least one inertial element 2, and/or the virtual pivot 200, and/or the flexible suspension 300, and/or the first intermediate mass 303, and/or the transverse translation table 32, and/or a divisible element 319; each elementary one-piece assembly can be assembled with at least one other elementary one-piece assembly by bonding or similar, by mechanical assembly, or by $SiO_2$ growth in the case of a silicon execution, or similar.

More particularly, such an elementary one-piece assembly further includes at least one level of the second intermediate mass 305 and/or of the longitudinal translation table 31.

The invention further relates to a horological movement including at least one such resonator mechanism 100.

The invention further relates to a watch including such a movement and/or including at least one such resonator mechanism 100.

The invention claimed is:

1. A horological resonator mechanism, comprising a structure and an anchoring unit from which is suspended at least one inertial element arranged to oscillate along a first degree of freedom in rotation RZ about a pivoting axis extending along a first direction Z, said inertial element being subjected to return forces exerted by a virtual pivot including a plurality of elastic strips, each fastened, at a first end to said anchoring unit, and at a second end to said inertial element, each said elastic strip being deformable essentially in a plane XY perpendicular to said first direction Z, said anchoring unit being suspended from said structure by a flexible suspension arranged to allow mobility of said anchoring unit along a plurality of degrees of freedom including at least two in the plane XY, along a direction X and along a direction Y orthogonal to said direction X, said flexible suspension including, between said anchoring unit and a first intermediate mass, which is fastened to said structure directly or with a flexible plate along said first direction Z, a transverse translation table with flexible guidance and including transverse table strips or rectilinear, transverse flexible table rods, extending along said second direction X, said horological resonator mechanism comprising banking means arranged to limit travel in rotation and in translation of the flexible suspension in the first direction Z.

2. The resonator mechanism according to claim 1, wherein said banking means are arranged to limit the travel in rotation and in translation of the flexible suspension in a direction of the plane XY.

3. The resonator mechanism according to claim 1, wherein said banking means comprise a stud extending perpendicularly to the plane XY.

4. The resonator mechanism according to claim 1, wherein the travel is limited to a predefined value.

5. The resonator mechanism according to claim 4, wherein said banking means are arranged at a distance corresponding to the predefined value.

6. The resonator mechanism according to claim 4, wherein said banking means are arranged through an opening in the flexible suspension, the opening having dimensions corresponding to the predefined value.

7. The resonator mechanism according to claim 1, wherein said banking means include a shock-absorbing material.

8. The resonator mechanism according to claim 1, wherein said banking means include a rigid material.

9. The resonator mechanism according to claim 1, wherein said banking means include at least two stages to control a shake of a second intermediate mass.

10. The resonator mechanism according to claim 1, wherein said flexible suspension includes a second intermediate mass and a longitudinal translation table with flexible guidance, the longitudinal translation table being arranged between said anchoring unit and the second intermediate mass, the longitudinal translation table including longitudinal table strips or rectilinear, longitudinal flexible table rods, extending along said third direction Y, and said transverse translation table being between said second intermediate mass and said first intermediate mass.

11. The resonator mechanism according to claim 10, wherein said banking means are disposed such that said banking means are arranged to cooperate in banking support with said second intermediate mass for a protection of said transverse or longitudinal table strips or table rods at least against shocks in the direction Z.

12. The resonator mechanism according to claim 10, comprising a viscous substance arranged on the table strips or table rods of the translation tables, to dissipate the energy in the event of a shock.

13. The resonator mechanism according to claim 1, wherein the mobility of said anchoring unit is possible along five degrees of freedom of the flexible suspension which are a first degree of freedom in translation along said first direction Z, a second degree of freedom in translation along the second direction X orthogonal to said first direction Z, a third degree of freedom in translation along the third direction Y orthogonal to said second direction X and to said first direction Z, a second degree of freedom in rotation RX about an axis extending along said second direction X, and a third degree of freedom in rotation RY about an axis extending along said third direction Y.

14. The resonator mechanism according to claim 13, wherein said flexible suspension includes a second intermediate mass and a longitudinal translation table with flexible guidance, the longitudinal translation table being arranged between said anchoring unit and the second intermediate mass, the longitudinal translation table including longitudinal table strips or rectilinear, longitudinal flexible table rods, extending along said third direction Y, and said transverse translation table being between said second intermediate mass and said first intermediate mass.

15. The resonator mechanism according to claim 14, wherein said longitudinal flexible table strips or table rods are parallel with one another and of the same length.

16. The resonator mechanism according to claim 15, wherein said longitudinal and transverse table strips or table rods are characterised by the thickness thereof along said second direction X when said table strip or table rod extends along said third direction Y or vice versa, by the height thereof along said first direction Z, and by the length thereof along the direction along which said table strip or table rod extends, said length being at least five times greater than said height, said height being at least as great as said thickness.

17. The resonator mechanism according to claim 1, wherein said transverse translation table includes at least two said transverse flexible table strips or table rods are parallel with one another and of the same length.

18. The resonator mechanism according to claim 17, wherein said transverse table strips or table rods of said transverse translation table have a first plane of symmetry parallel with a transverse axis and passing through said pivoting axis, and/or a second plane of symmetry parallel with said transverse axis and orthogonal to said pivoting axis, and/or a third plane of symmetry perpendicular to said transverse axis and parallel to said pivoting axis.

19. The resonator mechanism according to claim 18, wherein said resonator mechanism includes axial banking means including at least a first axial banking and a second axial banking to limit travel in translation of said inertial element at least along said first direction Z, said axial banking means being arranged to cooperate in banking support with said inertial element for a protection of said elastic strips at least against axial shocks along said first direction Z, and wherein said second plane of symmetry is substantially at equal distance from said first axial banking and said second axial banking.

20. The resonator mechanism according to claim 1, wherein a longitudinal axis intersects said transverse axis.

21. A horological movement including at least one resonator mechanism according to claim 1, and an escapement mechanism, which are arranged to cooperate with one another.

22. A horological resonator mechanism, comprising a structure and an anchoring unit from which is suspended at least one inertial element arranged to oscillate along a first degree of freedom in rotation RZ about a pivoting axis extending along a first direction Z, said inertial element being subjected to return forces exerted by a virtual pivot including a plurality of elastic strips, each fastened, at a first end to said anchoring unit, and at a second end to said inertial element, each said elastic strip being deformable essentially in a plane XY perpendicular to said first direction Z, said anchoring unit being suspended from said structure by a flexible suspension arranged to allow mobility of said anchoring unit along a plurality of degrees of freedom including at least two in the plane XY, along a direction X and along a direction Y orthogonal to said direction X, said flexible suspension including, between said anchoring unit and a first intermediate mass, which is fastened to said structure directly or with a flexible plate along said first direction Z, a transverse translation table with flexible guidance and including transverse table strips or rectilinear, transverse flexible table rods, extending along said second direction X, said horological resonator mechanism comprising banking means arranged to limit travel in rotation and/or in translation of the flexible suspension in at least one direction, wherein the travel is limited to a predefined value, and wherein said banking means are arranged through an opening in the flexible suspension, the opening having dimensions corresponding to the predefined value.

* * * * *